Patented Apr. 20, 1926.

1,581,421

UNITED STATES PATENT OFFICE.

ANTON N. BEEBE, OF SEATTLE, WASHINGTON, ASSIGNOR TO JAY TODD AND VERNE J. TODD, BOTH OF SEATTLE, WASHINGTON.

CLEANER AND PAINT REMOVER.

No Drawing.    Application filed December 1, 1924.    Serial No. 753,355.

*To all whom it may concern:*

Be it known that I, ANTON N. BEEBE, citizen of the United States, residing at Seattle, county of King, and State of Washington, have invented a new and useful Cleaner and Paint Remover; and I do hereby declare that the following is a full, clear, and exact specification, such as will enable others skilled in the art to which it appertains to make and use the same.

The invention is a composition that will readily remove paint or the like, dirt or grease in any form, and which may also be used for all kinds of cleaning.

The object of the invention is to provide a means for thoroughly cleaning all kinds of objects or surfaces.

Another object of the invention is to provide a composition that will readily remove paint or the like.

Another object of the invention is to provide a composition that will readily remove old grease and dirt from tanks or the like.

And a further object of the invention is to provide a composition for readily cleaning all kinds of objects or surfaces.

With these ends in view, the invention embodies a composition containing potash, glycerine, clorox, aqua ammonia, corn starch, grain alcohol, anise oil, sodium silicate, and distilled water.

In preparing the composition, I prefer to use the ingredients in about the following proportions:—Eight ounces of potash, one and a half ounces of glycerin, one ounce of clorox, two ounces of aqua ammonia, three and a half ounces of corn starch, sixteen ounces of grain alcohol, ten drops of anise oil, two and a half ounces of sodium silicate and five pounds of distilled water.

The clorox above referred to is a mixture of chloride of lime and water.

The above ingredients properly mixed will make one gallon of the composition which may be used for all kinds of purposes, such as removing paint, varnish, and kalsomine, cleaning tile floors, linoleum, building stone, cleaning oil containers, wash bowls, et cetera, removing dirt and grease from stoves, cleaning nickel, granite and baked enamel, removing wax and cleaning glass.

The concentration of the alcohol in the above composition is 90% and the concentration of the ammonia or aqua ammonia is 28%.

Having thus fully described the invention, what I claim as new and desire to secure by Letters Patent, is:—

1. A cleaner and paint remover formed by mixing eight ounces of potash, one and a half ounces of glycerin, one ounce of clorox, two ounces of aqua ammonia, three and a half ounces of corn starch, sixteen ounces of grain alcohol, ten drops of anise oil, two and half ounces of sodium silicate, and five pounds of distilled water.

2. A cleaner and paint remover formed by mixing eight parts potash, one and a half parts glycerin, one part clorox, two parts aqua ammonia, three and a half parts corn starch, sixteen parts grain alcohol, a small amount of anise oil, two and a half parts sodium silicate, and eighty parts distilled water.

3. A cleaner and paint remover of the class described formed by mixing potash, grain alcohol, corn starch, sodium silicate and water with small portions of glycerin, chloride of lime, aqua ammonia and anise oil.

ANTON N. BEEBE.